United States Patent Office 2,980,673
Patented Apr. 18, 1961

2,980,673

BIS-QUATERNARY AMMONIUM ESTERS OF AMINO-CARBOXYLIC ACIDS AND AMINO-ALCOHOLS

John Hidalgo, Berkeley, Calif., Arthur Rodney Williams, Golden, Colo., and Isaac Frederick Halverstadt, Berkeley, Calif., assignors to Cutter Laboratories, Inc., Berkeley, Calif., a corporation of California No Drawing. Filed Nov. 28, 1956, Ser. No. 624,717

9 Claims. (Cl. 260—247.2)

This invention relates to compositions of matter identified as ammonium salts of lower-alkyl esters of lower-alkyl acids.

The inventive concept resides in compositions having a molecular structure composed of bis-quaternary ammonium salts of bis-lower-alkyl-substituted-amine-substituted-lower-alkyl-esters of a bis-lower-alkyl acid wherein at least one of said bis-lower alkyl-substituted-amine groups has its two lower-alkyl substituents joined as part of a heterocyclic ring, having up to two heterocyclic ring atoms.

The invention can be illustrated by the following structural formulae:

(A) 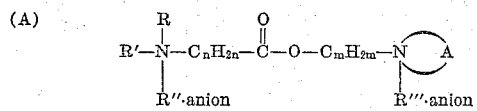

wherein $n$ and $m$ are integers from one to six, inclusive, R, R', R'', and R''' are lower-alkyl radicals, A is the residue of an N-heterocyclic radical, and anion is the non-toxic anion of a salt-forming acid; and, (B) 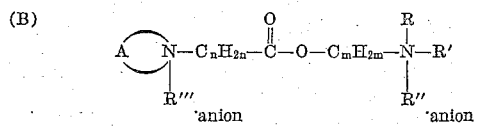

wherein R, R', R'' and R''' are lower-alkyl radicals containing up to and including six carbon atoms, $n$ and $m$ are integers from one to six, inclusive, A is the residue of an N-heterocyclic radical and anion is the non-toxic anion of a salt-forming material; and (C) 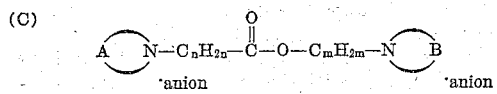

wherein A and B each are residues of heterocyclic ammonio groups, wherein $n$ and $m$ are integers from one to six, inclusive, and wherein anion is the non-toxic anion of a salt-forming acid.

Because certain of the compounds contemplated within the scope of this invention will contain heterocyclic groups containing only two valences attached to the nitrogen, in order that a quaternary or ammonio nitrogen can be present, substitution on the nitrogen by a lower-alkyl group containing up to six carbon atoms, inclusive, is necessary. In the above formulae, the A and B portions of the molecules are intended to include this quaternizing alkyl group where necessary.

Pharmacological evaluation of the physical embodiments of the concept constituting the present invention in rats, cats, rabbits and dogs has indicated that the compounds are useful as hypotensor agents. This activity is apparently due to ganglionic blockade. The compounds of Formulae A and B exhibit an excellent degree of hypotensor activity, which activity is moderate to prolonged in length, and accompanied by weak to moderate cholinergic activity sufficient to prevent the intestinal stasis and the anhydrosis which are the most disagreeable side effects of the currently available hypotensor agents. The compounds of Formula C exhibit a very prolonged hypotensor activity of moderate to very powerful degree and exhibit virtually no cholinergic activity. This indicates that the compounds are of value in the treatment of chronic hypertension.

Preparation of the compounds of the present invention may be accomplished by one or both of two general procedures, depending on the availability of starting materials. One procedure involves diquaternizing the free base of the desired end product bis-quaternary ammonium salt. The other procedure involves reacting the appropriate trialkylamine or heterocyclic tertiary amine with the appropriate halogen substituted ester; or, reacting an appropriate alpha, omega dihalide ester with an appropriate quaternizing N-heterocyclic material.

For ease in understanding the general methods of preparation, they will be separately described in detail for compounds of the type shown in Formulae A, B and C above.

Thus, for Formula A compounds:

One method includes the reaction of a compound having the formula:

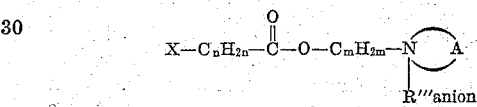

wherein $n$, $m$, R''', A and anion have the hereinbefore assigned values, and X is a halogen selected from the group consisting of chlorine, bromine, and iodine, with an appropriate trialkylamine having the formula:

wherein R, R', and R'' have the hereinbefore assigned values. The reaction is accomplished by the contact interaction of the reactants, preferably in the presence of a solvent, such as, for example, dioxane, acetone, chloroform, methanol, et cetera. A substantial molecular excess of the tertiary amine is normally employed, and, with a proper selection of solvents, the desired compound will normally crystallize, but if the product does not crystallize, recovery may be accomplished by removal of the solvent.

The second method of preparation involves firstly the preparation of compounds, some of which are per se novel, having the formula:

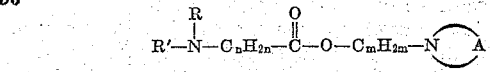

wherein R, R', $n$ and $m$ and A have the hereinbefore assigned values. These compounds are reacted with a quaternizing material having the formula:

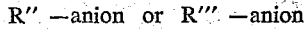

wherein R'', R''' and anion have the hereinbefore assigned values. This reaction is conducted in the presence of a suitable solvent, such as, for example, methanol, ethanol, acetone, acetonitrile, ether, chloroform, et cetera. A substantial molecular excess of the quaternizing material is usually employed. Again by a proper selection of solvents, upon cooling of the reaction mixture, separation of the products will occur, or the product may be recovered by removal of the solvent. Purification of the products can be accomplished by conventional crystallization technique.

The compounds of this invention are crystalline solids, generally very soluble in water.

Where the anion resulting from the synthesis procedure is other than the one desired, by using a transhalogenation method, or ion exchange technique, other anions, such as, for example, the chloride, bromide, iodide, nitrate, tartrate, sulfate, citrate, picrate, et cetera, may be substituted.

And, for Formula B compounds:

One method of preparation involves the reaction of a quaternizing material with a compound having the formula:

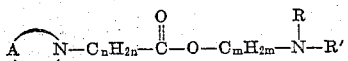

wherein R, R', n and m and A have the previously assigned values. The other method involves the reaction of a compound having the formula:

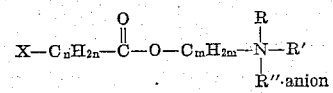

wherein n, m, R', R'' and anion have the hereinbefore assigned values, and X is a halogen, either chlorine, bromine or iodine. This compound is reacted with a compound having the formula:

wherein A and R''' have the previously assigned values.

The first method may be readily accomplished by the contact interaction of the reactants. Suitable quaternizing materials are, for example, ethyl bromide, propyl iodide, pentyl sulfate, hexyl nitrate, et cetera, that is a compound having the formula:

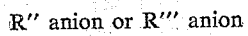

wherein R'', R''' and anion have the hereinbefore assigned values. Contact of the reactants is usually accomplished in the presence of a solvent, such as, for example, methanol, ethanol, chloroform, acetone, ether, acetonitrile, et cetera, and with a proper selection of solvent, the reaction product will crystallize from the solvent. A substantial molecular excess of the quaternizing material is usually employed, and the reaction being exothermic, the mixing of the reactants should be done carefully. The reaction temperature may vary between room temperature and reflux temperature of the reaction mixture. Adjustment of the reaction temperature may be accomplished by controlling the rate of introduction of the reactants, heating and cooling means, et cetera. In the event that the reaction product does not crystallize, recovery can be accomplished by removal of the solvent.

The second synthesis method, involving the reaction of a heterocyclic tertiary amine with a halogen substituted ester is also readily accomplished by the contact interaction, of the reactants in the presence of a suitable solvent, such as, for example, acetone, methanol, ethanol, chloroform, dioxane, acetonitrile, et cetera. A substantial molecular excess of the heterocyclic amine is usually employed, and in general, the reaction is conducted in the same manner as the first method, and the product recovered in the same manner, or ether can be added to cause separation of the product.

Purification of the products may be accomplished by conventional recrystallization techniques.

Where the anion which results from the reaction mixture is other than the desired anion, by utilizing an anion exchange resin or an interhalogen exchange technique, it is possible to interchange the anion for another. Representative anions which are suitable include, for example, chloride, bromide, iodide, picrate, sulfate, nitrate, citrate, bitartrate, et cetera.

The compounds of the present invention are crystalline solids, soluble in water.

And for Formula C compounds:

One method involves the diquaternization of an N-heterocyclicalkyl N-heterocyclicalkylate with an appropriate salt-forming agent, such as a lower-alkyl halide. The other method involves the reaction of a haloalkyl haloalkanoate with an appropriate N-heterocyclic material.

The first type of reaction may be readily accomplished by the contact interaction of the reactants. If the tertiary amine is present as its acid addition salt, this acid must be removed, which can be accomplished by conventional neutralization techniques coupled with extraction. The free ditertiary amino ester is contacted with appropriate quaternizing materials, such as, for example, ethyl bromide, propyl iodide, butyl bromide, pentyl iodide, methyl sulfate, butyl nitrate, et cetera. Desirably, the reaction is conducted in the presence of a suitable solvent, such as, for example, acetone, chloroform, acetonitrile, methanol, ether, et cetera. Where a proper selection of the solvent is made, the desired end product will crystallize, however, if this does not occur, removal of the solvent will leave the desired material. A substantial molecular excess of the quaternizing agent is usually employed, and the reaction is usually conducted at about room temperature and a time of about one day is normally sufficient to obtain satisfactory yields. Purification can be accomplished by conventional recrystallization techniques.

The second technique of synthesis involves the reaction of a compound having the formula:

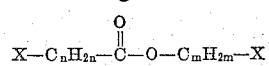

wherein n and m have the hereinbefore assigned values, and wherein X is chlorine, bromine and iodine. This ester is reacted with a quaternizing N-heterocyclic material having the formula:

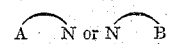

wherein A and B have the hereinbefore assigned values. The anion which results will correspond to the halogen substituted on the above starting ester. Reaction is usually accomplished by heating the reactants in the presence of a suitable solvent, such as, for example, acetone, chloroform, acetonitrile, methanol, dioxane, et cetera. In order that the reaction may be speeded, temperatures about those of reflux are employed. A substantial molecular excess of N-heterocyclic quaternizing material is usually employed, and the desired product, if it does not crystallize when the reaction mixture is cooled, may be recovered by removal of the solvent. Purification may be accomplished by conventional recrystallization techniques.

The compounds of the present invention are crystalline solids, very soluble in water.

Different anions may be substituted, such as, for example, chloride, bromide, iodide, picrate, sulfate, nitrate, citrate, et cetera, by conventional interhalogenation techniques, or by using an ion exchange resin.

Since some of the intermediates used in the preparation of the compounds of the present invention are novel, the following preparations are given to illustrate methods whereby they may be prepared, but are not to be construed as limiting:

PREPARATION 1

*3-iodopropionyl chloride*

A mixture of 36.0 grams (0.18 mole) of 3-iodopropionic acid and fourteen milliliters of phosphorous trichloride was heated under reflux (steam bath) for five hours. During this time, the material turned red-brown and deposited a dark resinous material. The solution was distilled under reduced pressure giving 29.6 grams (0.135 mole) (75 percent of the theoretical yield) of pale tan 3-iodopropionyl chloride, boiling at 75–80 degrees centigrade at eighteen millimeters of mercury pressure absolute.

PREPARATION 2

2-(1-ethylpiperidinio)ethanol iodide

A solution of 9.0 grams (0.079 mole) of 1-ethylpiperidine and 13.5 grams (0.079 mole) of 2-iodoethanol in fifty milliliters of methanol was heated under reflux for 24 hours. The solution, a deep violet, was treated with ether to turbidity and placed in an ice chest. After cooling overnight, there was deposited a yellow oil which crystallized on standing in the cold for several days. The crystals were re-dissolved in fifty milliliters of methanol plus 100 milliliters of acetone, and ether was added to the hot solution. On cooling, there was obtained 10.3 grams of 2-(1-ethylpiperidine)ethanol iodide, as colorless crystals, melting at 240 degrees centigrade. The mother liquors yielded an additional 3.1 grams of crystals, raising the yield to 13.4 grams or sixty percent of the theoretical yield.

PREPARATION 3

2-(1-methylpiperidinio)ethanol iodide

A solution of 10.0 grams (0.077 mole) of 1-piperidineethanol (Arch. intern. pharmacodynamie 84, 237 [1950]) and 22 grams (0.15 mole) of methyl iodide in 25 milliliters of methanol was stoppered and allowed to stand at room temperature for twenty hours. The solution was warmed to reflux, fifteen milliliters of ether was added, and the flask placed in an ice chest. After cooling overnight, there was obtained 18.1 grams of 2-(1-methylpiperidinio)ethanol iodide as colorless crystals melting at 235–238 degrees centigrade. The motor liquor yielded an additional 1.4 grams, bringing the total yield to 19.5 grams (93 percent of theoretical yield).

PREPARATION 4

Alpha, 4-dimethyl-1-piperidineethanol

Twenty-five grams (0.25 mole) of 4-pipecoline and 14.5 grams (0.25 mole) of propylene oxide were refluxed for four and one-half hours, and then distilled at atmospheric pressure. Thirty-two (32) grams (80 percent of the theoretical yield) of alpha, 4-dimethyl-1-piperidineethanol was collected between 210 and 212 degrees centigrade, leaving a small residue.

Analysis.—Calculated for $C_9H_{19}NO$: N, 8.91. Found: N, 9.02.

PREPARATION 5

1-methyl-2-(4-methyl-1-piperidyl)ether acrylate

To a flask with reflux condenser and drying tube and containing 9.0 grams (0.10 mole) of acrylyl chloride in 200 milliliters of benzene was added 15.7 grams (0.10 mole) of alpha, 4-dimethyl-1-piperidineethanol slowly with intermittent shaking. There was little heat evolved during the addition period of 45 minutes. After 2.5 hours of refluxing, the reaction mixture was cooled in an ice bath, mixed with 25 milliliters of cold saturated aqueous sodium chloride and sixteen grams (0.12 mole) of cold potassium carbonate in 25 milliliters of water, and the benzene layer separated. The benzene solution was combined with two benzene washes of the aqueous phase, washed with saturated sodium chloride and dried over sodium sulfate.

The benzene was removed by distillation, and the residue was distilled. The product boiled at 85 degrees centigrade at 2.5 millimeters of mercury pressure absolute, with no other fraction or residue being found, yielding 14.5 grams of 1-methyl-2-(4-methyl-1-piperidyl)ethyl acrylate (69 percent of the theoretical yield).

Analysis.—Calculated for $C_{12}H_{21}NO_2$: N, 6.63. Found: N, 6.42.

PREPARATION 6

1-methyl-2-(4-methyl-1-piperidyl)ethyl 3-dimethyl aminopropionate

Thirteen and four-tenths (13.4) grams (0.63 mole) of 1-methyl-2-(4-methyl-1-piperidyl)ethyl acrylate was treated with 2.86 grams (0.63 mole) of dimethylamine with cooling to facilitate absorption of gas, and the mixture was placed in a sealed tube and held at room temperature for seventeen days. The reaction product was then removed from the tube and distilled. Except for a few crystals and a very small residue, the entire reaction product boiled between 93 and 98 degrees centigrade at 1.5 millimeters of mercury pressure absolute.

Analysis.—Calculated for $C_{14}H_{28}N_2O_2$: N, 10.93. Found: N, 9.97.

This intermediate, although contaminated with about twenty percent of the acrylate ester, is suitable for the preparation of the desired quaternary compound.

PREPARATION 7

2-dimethylaminoethyl alpha-methyl-1-pyrrolidine-propionate

A solution of 0.5 gram of N-phenyl-2-naphthylamine in 15.7 grams (0.100 mole) of 2-dimethylaminoethyl methacrylate was treated with 10.7 grams (0.150 mole) of pyrrolidine. No exothermic reaction was noticed and so, after heating on a steam bath for 42 hours, and standing at room temperature for 53 hours more, the solution was distilled in vacuo. A very small forerun of pyrrolidine was collected at 40–45 degrees centigrade at 200 millimeters of mercury pressure absolute, followed by 17.5 grams (77 percent of the theoretical yield) of 2-dimethylaminoethyl alpha-methyl-1-pyrrolidinepropionate as nearly colorless product, boiling at 115–125 degrees centigrade at three millimeters of mercury pressure absolute.

Analysis.—Calculated for $C_{12}H_{24}N_2O_2$: N, 12.27. Found: N, 12.17.

PREPARATION 8

2-dimethylaminoethyl alpha-methyl-4-morpholine-propionate

A mixture of 31 grams (0.20 mole) of 2-dimethylaminoethyl methacrylate and 26 grams (0.30 mole) of morpholine was heated on a steam bath for 48 hours. The mixture was distilled at reduced pressure to give seventeen grams (35 percent of the theoretical yield) of 2-dimethylaminoethyl alpha-methyl-4-morpholinepropionate, boiling at 150–154 degrees centigrade at thirteen millimeters of mercury pressure absolute.

PREPARATION 9

2-trimethylammoniobutanol iodide

To a solution of 35.0 grams (0.88 mole) of sodium hydroxide and 36.0 grams (0.40 mole) of 2-amino-1-butanol in 250 milliliters of methanol, cooled in an ice bath, was added 187 grams (1.31 moles) of methyl iodide. After the exothermic reaction subsided, the solution was heated under reflux for four hours. An additional 75 grams (0.53 mole) of methyl iodide and 300 milliliters of acetone were added and refluxing was continued for three hours. No solid separated on standing at room temperatures overnight, so the solution was heated under reflux for seven hours, the solvent was evaporated, and the semi-solid residue was dissolved in 1000 milliliters of refluxing acetone, 500 milliliters of ether was added, and the solution placed in an ice chest. After cooling overnight, there was obtained 42 grams of colorless crystals, melting at 207–219 degrees centigrade. Another recrystallization from methanol-ether gave 31.5 grams (thirty percent of the theoretical yield) of 2-trimethylammoniobutanol iodide, as colorless crystals, melting at 223–226 degrees centigrade.

*Analysis.*—Calculated for $C_7H_{18}INO$: I, 48.98. Found: I, 49.40.

PREPARATION 10

*2-trimethylammoniobutyl 3-iodopropionate iodide*

A mixture of fifteen grams (0.058 mole) of 2-trimethylammoniobutanol iodide and fifteen grams (0.069 mole) of 3-iodopropionyl chloride was placed in a 100-milliliter Erlenmeyer flask, protected from moisture with a drying tube. The mixture became warm and set up to a homogeneous melt in fifteen minutes. The reaction was completed by warming on a steam bath for one hour. After digesting with three fifty-milliliter portions of ether to remove excess 3-iodopropionyl chloride, the brown residue was recrystallized from 25 milliliters of methanol to give a mass of pale yellow crystals. After one more recrystallization from methanol, there was obtained 12.6 grams of colorless crystals, melting at 127 degrees centigrade. Reworking of the mother liquors gave an additional 6.7 grams of colorless crystals, melting at 125–127 degrees centigrade, raising the total to 19.8 grams (75 percent of the theoretical yield) of 2-trimethylammoniobutyl 3-iodopropionate iodide.

*Analysis.*—Caluclated for $C_{10}H_{21}I_2NO_2$: C, 27.23; H, 4.80; I, 57.54. Found: C, 26.46; H, 4.70; I, 57.87.

PREPARATION 11

*2-(butylethylamino)ethanol*

A mixture of 51 grams (0.50 mole) of butylethylamine and 48 grams (0.60 mole) of ethylene chlorohydrin was heated at reflux for one-half hour. The mixture was cooled and poured into a solution of sodium carbonate, saturated with salt, and filtered. The filter cake was washed with 500 milliliters of benzene and the aqueous solution was extracted with 100-milliliter portions of benzene. After drying with potassium carbonate, the benzene solution was distilled. No higher boiling residue was obtained. The remaining aqueous solution was made strongly basic with twenty grams of sodium hydroxide and extracted with three 100-milliliter portions of benzene. Distillation of this gave 38 grams (52 percent of the theoretical yield) of 2-(butylethylamino)ethanol, boiling at 79–82 degrees centigrade at twelve millimeters of mercury pressure absolute.

PREPARATION 12

*2-(butylethylamino)ethyl acrylate*

A solution of 29 grams (0.20 mole) of 2-(butylethylamino)ethanol in fifty milliliters of benzene was added to thirty grams (0.33 mole) of acrylyl chloride at such a rate that the mixture refluxed gently. After refluxing one hour, the mixture was poured into 100 milliliters of water and 35 grams (0.33 mole) of sodium carbonate was added followed by five grams (0.125 mole) of sodium hydroxide. The layers were separated, the aqueous layer extracted with five 25-milliliter portions of benzene and the benzene extracts combined and dried. Distillation of the benzene gave 30.3 grams (76 percent of the theoretical yield) of 2-(butylethylamine)ethyl acrylate, boiling at 105–107 degrees centigrade at twelve millimeters of mercury pressure absolute.

PREPARATION 13

*2-(butylethylamino)ethyl 1-pyrrolidinepropionate*

Thirteen grams (0.18 mole) of pyrrolidine was mixed with thirty grams (0.15 mole) of 2-(butylethylamino)ethyl acrylate. The reaction was exothermic. After the initial internal heating had subsided, the mixture was refluxed for a few minutes, then distilled, yielding 25 grams (61 percent of the theoretical yield) of 2-(butylethylamino)ethyl 1-pyrrolidinepropionate, boiling at 168–171 degrees centigrade at twelve millimeters of mercury pressure absolute.

PREPARATION 14

*2-dimethylamino-1-methylethyl acrylate*

To 21 grams (0.23 mole) of acrylyl chloride in 200 milliliters of benzene was added 48 grams (0.46 mole) of 1-dimethylamino-2-propanol in 100 milliliters of benzene. Upon completion of the addition, the mixture was refluxed for two hours. The mixture was then poured into fifty milliliters of water and fifteen grams (0.37 mole) of sodium hydroxide was added. The aqueous layer was extracted with three fifty milliliter portions of benzene. Distillation of the combined extracts gave nine grams (25 percent of the theoretical yield) of 2-dimethylamino-1-methylethyl acrylate, boiling at 60–62 degrees centigrade at twelve millimeters of mercury pressure absolute.

PREPARATION 15

*2-dimethylamino-1-methylethyl 4-methyl-1-piperidine-propionate*

A mixture of nine grams (0.057 mole) of 2-dimethylamino-1-methylethyl acrylate and six grams (0.061 mole) of 4-pipecoline was refluxed for a few minutes. Distillation gave 11.1 grams (76 percent of the theoretical yield) of 2-dimethylamino-1-methylethyl 4-methyl-1-piperidine propionate, boiling at 153–155 degrees centigrade at twelve millimeters of mercury pressure absolute.

PREPARATION 16

*2-dimethylaminoethyl crotonate*

A solution of 22.28 grams (0.25 mole) of 2-dimethylaminoethanol in 25 milliliters of benzene was added dropwise to a solution of 26.1 grams (0.25 mole) of crotonyl chloride (prepared by the method of Brown, J. Am. Chem. Soc. 60, 1325 [1938]) in 225 milliliters of benzene in a 500-milliliter round-bottom flask. The addition required about fifteen minutes during which time the flask was shaken by hand to break up the crystalline mass. At the end of the addition, the temperature had risen to 50–55 degrees centigrade, the mixture was then refluxed on a steam bath for one and one-half hours.

After standing overnight the contents of the flask were cooled to 5 degrees centigrade, treated with fifty milliliters of cold water and shaken vigorously. A cold solution of forty grams (0.29 mole) of anhydrous potassium carbonate in 100 milliliters of water was added in small portions with shaking and the benzene layer was separated and washed with two fifty-milliliter portions of a cold, saturated aqueous sodium chloride. The benzene layer was dried over "Drierite" and the aqueous layers were added to the original aqueous layer, saturated with sodium chloride and extracted with two 25-milliliter portions and one fifty-milliliter portion of benzene. These benzene extracts were combined, washed with a little saturated aqueous sodium chloride solution and dried over "Drierite." On concentration of this latter benzene solution in vacuo at up to eighty degrees centigrade pot temperature, a residue of six grams remained; this was added to the residue which remained after similar treatment of the original benzene extract. A small amount of N-phenyl-2-naphthylamine was added and fractional distillation then yielded 33.29 grams (85 percent yield) of slightly colored product boiling at 76–78 degrees centigrade at six millimeters of pressure. Redistillation gave 31.76 grams (96 percent recovery) of colorless 2-dimethylaminoethyl crotonate, boiling at 74–77 degrees centigrade at six millimeters of mercury pressure absolute.

*Analysis.*—Calculated for $C_8H_{15}NO_2$: C, 61.12; H, 9.62; N, 8.91. Found: C, 60.79; H, 9.70; N, 8.73.

PREPARATION 17

2-dimethylaminoethyl beta-methyl-4-morpholine-propionate

A solution of 0.5 gram of N-phenyl-2-naphthylamine in 15.7 grams (0.10 mole) of freshly distilled 2-dimethylamino ethyl crotonate was treated with 13.1 grams (0.15 mole) of morpholine. There was no noticeable heat of reaction and so the clear solution was heated on a steam bath for 39 hours, allowed to stand at room temperature for about four days and distilled. Some 4.13 grams of morpholine was collected at 40–50 degrees centigrade at twenty millimeters of mercury pressure absolute, followed by 21.0 grams (86 percent yield) of practically colorless product at 118–130 degrees centigrade at one millimeter of mercury pressure absolute. This was redistilled to yield 19.12 grams (91 percent of the theoretical recovery) of 2-dimethylaminoethyl beta-methyl-4-morpholinepropionate, as a colorless product, boiling at 124–128 degrees centigrade at one millimeter of mercury pressure absolute.

Analysis.—Calculated for $C_{12}H_{24}N_2O_3$: C, 58.97; H, 9.90; N, 11.47. Found: C, 58.57; H, 9.93; N, 11.46.

PREPARATION 18

2-(ethylmethylamino)ethyl crotonate

To 18.6 grams (0.18 mole) of crotonyl chloride and 225 milliliters of dry benzene in a 500-milliliter flask with condenser, drying tube and dropping funnel, was added 18.3 grams (0.018 mole) of 2-(ethylmethylamino) ethanol [prepared by the method of Bachman and Meyhess, J. Org. Chem. 10, 243 (1945)], diluted with 25 milliliters of benzene. During the addition, which required fifteen to twenty minutes, the temperature rose to about fifty degrees centigrade and a second liquid phase was formed. The mixture was refluxed for two hours.

The mixture was cooled to five degrees centigrade in an ice bath after which a similarly cooled solution of 28 grams (0.2 mole) of potassium carbonate in twenty milliliters of water was added. The benzene layer was separated and the aqueous phase was extracted with two 25-milliliter portions and one fifty-milliliter portion of cold benzene. The benzene extracts were washed with a 25–50 milliliter portion of saturated sodium chloride solution, then dried over "Drierite." The dried benzene solution was distilled at reduced pressure. The residue was fractionally distilled to yield 22.9 grams (75 percent of the theoretical yield) of 2-(ethylmethylamino)ethyl crotonate, boiling at 55–65 degrees centigrade at 2.5 millimeters of mercury pressure absolute.

Analysis.—Calcuated for $C_9H_{17}NO_2$: N, 8.18. Found: N, 8.55.

PREPARATION 19

2-(ethylmethylamino)ethyl beta(methyl-1-pyrrolidine-propionate)

Ten and seven-tenths (10.7) grams (0.15 mole) of pyrrolidine was added to 21.0 grams (0.12 mole) of 2-(ethylmethylamino)ethyl crotonate in a flask with a condenser and drying tube. There was a rapid rise in temperature to about sixty degrees centigrade and the flask cooled briefly in a water bath. After standing several days at room temperature the reaction mixture was distilled yielding 24.1 grams (81 percent of the theoretical yield) of 2-(ethylmethylamino)ethyl beta-methyl-1-pyrrolidinepropionate, boiling at 90–95 degrees centigrade at 1.5 millimeters of mercury pressure absolute. There was no low boiling material and no residue.

Analysis.— Calculated for $C_{13}H_{26}NO_2$: N, 11.56. Found: N, 10.81.

PREPARATION 20

2-iodoethyl-3-iodopropionate

A solution of twenty grams (0.117 mole) of 2-chloroethyl-3-chloropropionate and 35.0 grams (0.23 mole) of sodium iodide in 100 milliliters of methylethyl ketone was refluxed on a steam bath for 24 hours. The salt cake which resulted was removed by filtration and the residue washed with fifty milliliters of methylethyl ketone. After combining the filtrate and wash, it was diluted to 500 milliliters with water and extracted with three 150-milliliter portions of ether. The ethereal solution was washed with 100 milliliters of saturated sodium bicarbonate solution, 100 milliliters of ten percent aqueous sodium thiosulfate, and dried over magnesium sulfate. The ether was distilled to yield 21 grams (51 percent of the theoretical yield) of a nearly colorless liquid, 2-iodoethyl-3-iodopropionate, boiling at 100–109 degrees centigrade at one millimeter of mercury pressure absolute.

PREPARATION 21

2-(1-piperidyl)ethyl 1-piperidinepropionate

To a solution of ten grams (0.028 mole) of 2-iodoethyl 3-iodopropionate in 100 milliliters of benzene was added 10.0 grams (0.12 mole) of piperidine. The solution became quite warm, deposited colorless crystals, and was allowed to stand for four days at room temperature. Filtering the benzene mixture gave 10.4 grams (86 percent of the theoretical yield) of piperidine hydriodide, melting at 187–188 degrees centigrade. The benzene filtrate was concentrated on a steam bath with an aspirator until no more solvent distilled, and the oily residue was distilled through a Claisen head yielding 4.5 grams (58 percent of the theoretical yield) of 2-(1-piperidyl)ethyl 1-piperidinepropionate, as a colorless oil, boiling at 175–182 degrees centigrade at 18–20 millimeters of mercury pressure absolute. The fraction was contaminated with a few drops of forerun and analysis showed it to be somewhat impure.

Analysis.—Calculated for $C_{15}H_{28}O_2N_2$: C, 67.12; H, 19.52. Found: C, 63.71; H, 19.65.

PREPARATION 22

2-(1-piperidyl)ethyl 1-piperidinepropionate dihydrochloride

A solution of 3.2 grams (0.0124 mole) of 2-(1-piperidyl)ethyl 1-piperidinepropionate in 150 milliliters of acetone was treated with four milliliters (ca. 0.024 mole) of concentrated hydrochloric acid. After standing at room temperature overnight, the colorless crystals were filtered and recrystallized twice from methanol-ether to give 2.3 grams (54 percent of the theoretical yield) of 2-(1-piperidyl)ethyl 1 - piperidinepropionate dihydrochloride, as colorless needles melting at 229 degrees centigrade.

Analysis.—Calculated: C, 52.78; H, 8.86. Found: C, 53.37; H, 8.14.

PREPARATION 23

2-bromoethyl 3-bromopropionate

One hundred thirty-two (132) grams (1.06 mole) of 2-bromoethanol was added to 181 grams (1.06 moles) of 3-bromopropionyl chloride over a thirty minute period. The resulting solution was heated on a steam bath for one hour. The solution was cooled and diluted with 200 milliliters of ether, and the ethereal solution was washed with three 150-milliliter portions of water. After drying over magnesium sulfate and filtering, the ether solution was distilled to give 211 grams (77 percent of the theoretical yield) of colorless liquid, 2-bromoethyl 3-bromopropionate, boiling at 126–130 degrees centigrade at fifteen millimeters mercury pressure absolute.

PREPARATION 24

2-(piperidyl)ethyl 1-piperidinepropionate dihydrochloride

A solution of 33.3 grams (0.123 mole) of 2-bromoethyl 3-bromopropionate and sixty grams (0.7 mole) of piperidine in 250 milliliters of dry benzene was heated under reflux for 72 hours. The cold reaction mixture was filtered yielding 40.1 grams (98 percent of the theoretical yield) of piperidine hydrobromide. The filtrate was evaporated on a steam bath to a colorless oil, which was distilled giving a colorless liquid boiling at 100–160 degrees centigrade at 13–20 millimeters of mercury pressure absolute. This distillate was dissolved in two liters of acetone and treated with 25 milliliters (0.3 mole) of concentrated aqueous hydrochloric acid. After cooling in an ice chest, the colorless crystalline material was filtered and recrystallized from methanol-ether to give 15.1 grams of 2-(1-piperidyl)ethyl 1-piperidinepropionate dihydrochloride. Reworking of the mother liquors gave an additional 2.1 grams of compound, making a total yield of 41 percent of the theoretical yield.

PREPARATION 25

1-bromo-2-propanol

To 174 grams (3.0 moles) of propylene oxide, cooled in an ice bath, was added 501 grams (3.0 moles) of 48 percent hydrobromic acid in 500 milliliters of water, with stirring, at such a rate as to maintain the temperature of the reaction mixture between 28 degrees and 31 degrees centigrade, one hour being required for the addition. The solution was allowed to stand at room temperature for one hour after the addition of the acid was complete. Sodium carbonate was added until the pH reached 9.0, whence two layers separated, and the 1-bromo-2-propanol was extracted with three 300-milliliter portions of chloroform. After drying over magnesium sulfate and filtering, the chloroform was flash distilled and atmospheric distillation continued until the reflux temperature reached seventy degrees centigrade. The residue was then distilled at reduced pressure, yielding 194 grams (47 percent of the theoretical yield) of colorless 1-bromo-2-propanol, boiling at 46–48 degrees centigrade at thirteen millimeters of mercury pressure absolute; and eighteen grams of liquid boiling at 48–55 degrees centigrade at thirteen millimeters of mercury pressure absolute.

PREPARATION 26

2-bromo-1-methylethyl 3-bromopropionate

A solution of 83.5 grams (0.49 mole) of 3-bromopropionyl chloride and 67.7 grams (0.49 mole) of 1-bromo-2-propanol was warmed on the steam bath until hydrogen chloride evolution commenced. The heat was removed until the gas evolution subsided, then the solution was heated on the steam bath for another hour. The cooled solution was dissolved in 300 milliliters of ether and washed with ten percent sodium carbonate solution until the washes were distinctly basic. After drying over sodium sulfate and filtering, the ether was flash distilled which gave 114.5 grams (86 percent of the theoretical yield) of colorless 2-bromo-1-methylethyl 3-bromopropionate, boiling at 123–126 degrees centigrade at thirteen millimeters of mercury pressure absolute.

Analysis.—Calculated for $C_6H_{10}Br_2O_2$: C, 26.30; H, 3.68; Br, 58.34. Found: C, 26.61; H, 3.74; Br, 58.40.

PREPARATION 27

1-methyl-2-(1-piperidyl)ethyl 1-piperidinepropionate

A solution of 17.0 grams (0.20 mole) of piperidine and 13.7 grams (0.050 mole) and 2-bromo-1-methylethyl 3-bromopropionate in 125 milliliters of dry benzene was heated under reflux. After sixteen hours under reflux, the reaction had slowed down considerably and an additional eight grams (0.1 mole) of piperidine was added and the refluxing continued for another sixteen hours. A total of 15.3 grams (93 percent of the theoretical yield) of piperidine hydrobromide was collected, and the benzene filtrate was distilled yielding 7.5 grams (53 percent of the theoretical yield) if it were pure diamino ester, of colorless liquid boiling at 170–177 degrees centigrade at 13 to 15 millimeters' pressure. This represents a mixture of eighty percent of the desired diamino ester and twenty percent of the monoamino monobromo ester.

PREPARATION 28

1-methyl-2-(4-morpholinyl)ethyl 4-morpholinepropionate

A solution of 17.4 grams (0.20 mole) of morpholine and 13.7 grams (0.050 mole) of 2-bromo-1-methlyethyl 3-bromopropionate in fifty milliliters of dry benzene was heated under reflux for forty hours, and filtered to give 12.5 grams (75 percent of the theoretical yield) of morpholine hydrobromide. The filtrate and benzene washes were combined (75 milliliters), treated with 8.7 grams (0.10 mole) of morpholine and refluxed another 48 hours. There was obtained another 3.5 grams (total yield was 95 percent of theoretical) of morpholine hydrobromide. The benzene fraction was distilled yielding 8.6 grams (60 percent of the theoretical yield) of colorless liquid boiling at 190–200 degrees centigrade at thirteen millimeters of mercury pressure. This corresponds to 84 percent of the desired diamino ester and sixteen percent monoamino ester. This mixture is used directly to prepare the diquaternary ester.

PREPARATION 29

Alpha-methyl-1-pyrrolidineethanol

A mixture of 71 grams (1.0 mole) of pyrrolidine and 64 grams (1.1 moles) of propylene oxide was heated on a steam bath for two and one-half hours. Distillation gave 105 grams (81 percent of the theoretical yield) of alpha-methyl-1-pyrrolidineethanol, boiling at 67–70 degrees centigrade at twelve millimeters of mercury pressure absolute.

PREPARATION 30

1-methyl-2-(1-pyrrolidinyl)ethyl acrylate

Twenty-six grams (0.20 mole) of alpha-methyl-1-pyrrolidineethanol in fifty milliliters of benzene was added to thirty grams (0.33 mole) of acrylyl chloride in 200 milliliters of benzene. This mixture was refluxed for two hours and then added to 100 milliliters of water. Sodium hydroxide was added until the mixture was basic and the aqueous solution was extracted with three fifty-milliliter portions of benzene. Distillation gave 29 grams (79 percent of the theoretical yield) of 1-methyl-2-(1-pyrrolidinyl)ethyl acrylate, boiling at 97–100 degrees centigrade at twelve millimeters of mercury pressure absolute.

PREPARATION 31

1-methyl-2-(1-pyrrolidinyl)ethyl 1-pyrrolidinepropionate

A solution of 29 grams (0.16 mole) of 1-methyl-2-(pyrrolidinyl)ethyl acrylate and seventeen grams (0.24 mole) of pyrrolidine was refluxed for a few minutes. Distillation gave 36 grams (89 percent of the theoretical yield) of 1-methyl-2-(1-pyrrolidinyl)ethyl 1-(pyrrolidinepropionate), boiling at 165–168 degrees centigrade at twelve millimeters of mercury pressure absolute.

While the above preparations show a representative group of compounds useful as intermediates, other similar compounds, including those having different alkylene chains, may be readily prepared by substituting appropriate starting materials for those specifically shown.

EXAMPLES

The following examples are given to illustrate compounds of the present invention and certain processes whereby such compounds may be prepared, but are not to be construed as limiting the invention thereto.

EXAMPLE 1

2-(1-ethylpiperidinio)ethyl 3-trimethylammoniopropionate diiodide

A mixture of 10.0 grams (0.035 mole) of 2-(1-ethylpiperidinio)ethanol iodide and 26 grams (0.12 mole) of 3-iodopropionyl chloride was heated on a steam bath for one hour. The cooled liquid was digested with two fifty-milliliter portions of ether, the ether being removed by decantation. The red-brown residue was warmed with ten milliliters of methanol to remove the last traces of 3-iodopropionyl chloride, and 200 milliliters of ether was added. The supernatant liquid was removed, and the residue once more digested with fifty milliliters of ether. The residual oil was dissolved in ten milliliters of methanol and to this was added 25 milliliters of dioxane and a solution of 2.1 grams (0.036 mole) of trimethylamine in sixteen milliliters of dioxane. A dark brown oil separated which gradually crystallized. After three days, the solid was filtered and recrystallized three times from 25-milliliter portions of methanol to give 10.6 grams of 2-(1-ethylpiperidinio)ethyl 3-trimethylammoniopropionate diiode, as colorless rosettes, melting at 169–171 degrees centigrade. Another 1.6 grams was obtained by reworking the mother liquors, bringing the total yield to 12.2 grams.

Analysis.—Calculated for $C_{15}H_{32}I_2N_2O_2$: C, 34.23; H, 6.13; I, 48.23. Found: C, 34.12; H, 6.57; I, 48.18.

Other compounds having different halogen anions can be prepared by substituting chlorine or bromine for the iodine at the appropriate steps in the synthesis. Alternatively, the iodide can be converted to other anions by using ion exchange resins in the conventional manner as is shown hereinafter.

EXAMPLE 2

2-(1-methylpiperidinio)ethyl 3-trimethylammoniopropionate diiodide

A mixture of thirteen grams (0.048 mole) of 2-(1-methylpiperidinio)ethanol iodide and fifteen grams (0.069 mole) of 3-iodopropionyl chloride was placed in a 100-milliliter flask equipped with a drying tube. The mixture became warm and set to a homogeneous melt in fifteen minutes. The mixture was heated on a steam bath for one hour to complete the reaction. After digesting with three fifty-milliliter portions of ether, the red-brown residual oil was dissolved in twenty milliliters of methanol and transferred to a 250-milliliter Erlenmeyer flask. After cooling in an ice chest for eighteen hours, no crystals appeared, so the solution was treated with five grams (0.085 mole) of trimethylamine dissolved in fifty milliliters of chloroform. A few milliliters of ether was added to produce just a turbidity, and the flask was allowed to stand at room temperature for 24 hours, at which time a few crystals had appeared. An additional fifty milliliters of ether was added to force out an orange oil; the supernatant liquid was decanted, and the residue was digested with 100 milliliters of acetone to give a colorless crystalline solid, which was recrystallized from 25 milliliters of methanol and twenty milliliters of ether to give 12.9 grams (52 percent of the theoretical yield) of 2-(1-methylpiperidinio)ethyl 3-trimethylammoniopropionate diiodide as colorless crystals, melting at 170–171 degrees centigrade. After drying at 100 degrees centigrade in vacuo:

Analysis.—Calculated for $C_{14}H_{30}I_2N_2O_2 \cdot H_2O$: C, 31.71; H, 6.08; I, 47.87; N, 5.28. Found: C, 31.72; H, 6.11; I, 48.88; N, 5.22.

EXAMPLE 3

2-(1-methylpyrrolidinio)ethyl 3-trimethylammoniopropionate diiodide

A mixture of fifteen grams (0.058 mole) of 2-(1-methylpyrrolidinio)ethanol iodide [prepared according to Ber. 55, 1666 (1922), melting point 179–180 degrees centigrade], and fifteen grams (0.069 mole) of 3-iodopropionyl chloride was placed in a flask equipped with a drying tube. The flask was heated gently with a free flame until the mixture became a homogeneous melt, and the reaction was completed by placing the flask in an oil bath at 80–90 degrees centigrade for 45 minutes. After digesting with five fifty-milliliter portions of ether, the red oil was dissolved in fifty milliliters of acetone, filtered and placed in an ice chest. No material separated after cooling overnight; therefore, five grams (0.085 mole) of trimethylamine in 75 milliliters of chloroform was added and the mixture shaken vigorously. After standing at room temperature overnight, the supernatant liquid was decanted from the crystalline mass. After two recrystallizations from methanol-ether there was obtained 21.5 grams of 2-(1-methylpyrrolidinio)ethyl 3-trimethylammoniopropionate diiodide, as colorless crystals, melting at 190 degrees centigrade. An additional 2.1 grams was obtained by reworking the mother liquors, bringing the total yield to 23.6 grams (81 percent of the theoretical yield).

Analysis.—Calculated for $C_{13}H_{28}I_2N_2O_2$: C, 31.34; H, 5.67; I, 50.95. Found: C, 31.08; H, 5.52; I, 51.82.

EXAMPLE 4

2-(4-methylmorpholinio)ethyl 3-trimethylammoniopropionate diiodide

A mixture of sixteen grams (0.059 mole) of 2-(4-methylmorpholinio)ethanol iodide [prepared according to J. Chem. Soc. 819 (1946), finely ground and freshly dried], and fifteen grams (0.069 mole) of 3-iodopropionyl chloride was placed in a flask equipped with a drying tube and heated gently with a free flame until it became a homogeneous melt. The reaction was completed by warming on the steam bath for one hour. After digesting with three fifty-milliliter portions of ether, the red oil was dissolved in fifty milliliters of refluxing methanol, filtered and placed in an ice chest. No material separated after cooling overnight, so the red oil was forced out of solution with 150 milliliters of ether, the supernatant liquid was decanted and the residual oil was shaken with five grams (0.08 mole) of trimethylamine in 75 milliliters of chloroform. After standing at room temperature overnight, the supernatant liquid was decanted from the pale yellow viscous oil. After two recrystallizations from 100-milliliter portions of methanol, there was obtained 16.1 grams of 2-(4-methylmorpholinio)ethyl 3-trimethylammoniopropionate diiodide as colorless crystals melting at 188–190 degrees centigrade. An additional 2.2 grams of the compounds was obtained by reworking the mother liquors, making a total yield of 18.3 grams (61 percent of the theoretical yield).

Analysis.—Calculated for $C_{13}H_{28}I_2N_2O_3$: C, 30.36; H, 5.49; I, 49.37. Found: C, 30.42; H, 5.46; I, 49.89.

EXAMPLE 5

2-(1,4-dimethylpiperidinio)1-methylethyl 3-trimethylammoniopropionate diiodide Ten grams (0.039 mole) of 1-methyl-2-(4-methyl-1-piperidyl)ethyl 3-dimethylaminopropionate in 500 milliliters of acetone was refluxed for one hour with twenty grams (0.071 mole) of methyl iodide. The reaction mixture was cooled to yield 16.3 grams (77 percent of the theoretical yield) of 2-(1,4-dimethylpiperidinio)-1-methylethyl 3-trimethylammoniopropionate diiodide. After two recrystallizations from wet acetone, the melting point was 170–172 degrees centigrade.

Analysis.—Calculated for $C_{16}H_{34}I_2N_2O_2$: C, 35.57; H, 6.34; I, 46.95; N, 5.19. Found: C, 35.18; H, 5.84; I, 46.28; N, 4.85.

In the manner of the foregoing examples other heterocyclic alcohol diammonio esters having other alcohol moiety alkylene groups, such as, for example, methylene, propylene, butylene, isobutylene, pentylene, hexylene, et cetera, for the specific groups shown; other acid moiety alkylene groups, such as, for example, methylene, propylene, isopropylene, butylene, isobutylene, pentylene, hexylene, et cetera, for the ethylene specifically shown; other alkyl groups for the trimethyl shown, such as, for example, dimethylethyl, triethyl, tripropyl, tributyl, dimethylhexyl, et cetera, and other alkyl groups may be substituted for methyl substituent on the heterocyclic residue, such as, for example, ethyl, propyl, isopropyl, butyl, isobutyl, pentyl, hexyl, et cetera, by substituting appropriate starting materials for those specifically shown.

EXAMPLE 6

*2-(1-ethylpiperidinio)ethyl 3-trimethylammoniopropionate dichloride*

Ten grams of 2-(1-ethylpiperidinio)ethyl 3-trimethylammoniopropionate diiodide was dissolved in 25 milliliters of water and passed through a twenty gram column of anion exchange resin in the chloride state, followed by a 75-milliliter water wash. The column eluate was evaporated under vacuum and finally dried with benzene. The residue was triturated several times with acetone, and then the solid was collected and redried. The yield of 2-(1-ethylpiperidinio)ethyl 3-trimethylammoniopropionate dichloride, melting at 200–201 degrees centigrade was 93 percent of the theoretical.

*Analysis.*—Calculated for $C_{15}H_{32}Cl_2N_2O_2$: Cl, 20.65. Found: Cl, 20.32.

EXAMPLE 7

*2-(1-ethylpiperidinio)ethyl 3-trimethylammoniopropionate dinitrate*

To a solution of twenty grams of the 2-(1-ethylpiperidinio)ethyl 3-trimethylammoniopropionate diiodide in thirty milliliters of water was added a solution of 12.9 grams of silver nitrate in twenty milliliters of water. The precipitate was removed and the filtrate was evaporated under reduced pressure to an oily residue which was dissolved in methanol. The 2-(1-ethylpiperidinio)-ethyl 3-trimethylammoniopropionate dinitrate, melting at 142 degrees centigrade, was precipitated and crystallized by the addition of ether, then recrystallized a second and third time, using, in order, isopropanol and ethanol.

*Analysis.*—Calculated for $C_{15}H_{32}N_4O_8$: C, 45.44; H, 8.14. Found: C, 45.16; H, 7.86.

EXAMPLE 8

*2-(1-ethylpiperidinio)ethyl 3-trimethylammoniopropionate dibitartrate*

In the same manner as Example 7, the dibitartrate was prepared by reacting the diiodide salt with silver bitartrate in an aqueous solution, removing the silver iodide, and recovering the crystalline 2-(1-ethylpiperidinio)ethyl 3-trimethylammoniopropionate dibitartrate, melting at 123–126 degrees centigrade.

*Analysis.*—Calculated for $C_{12}H_{42}N_2O_{14}$: C, 48.3; H, 7.41. Found: C, 48.8; H, 7.6.

EXAMPLE 9

*2-(1-ethylpiperidinio)ethyl 3-trimethylammoniopropionate dipicrate*

One gram of 2-(1-ethylpiperidinio)ethyl 3-trimethylammoniopropionate diiodide was dissolved in 250 milliliters of water and treated with two grams of picric acid. The precipitated dipicrate salt was removed and recrystallized from 95 percent ethanol. The salt melted at 182–183 degrees centigrade.

*Analysis.*—Calculated for $C_{27}H_{36}N_2O_{10}$: C, 44.51; H, 4.98. Found: C, 44.26; H, 5.08.

EXAMPLE 10

*2-trimethylammonioethyl 2-methyl-3-(1-methyl-pyrrolidinio)-propionate diiodide*

A solution of 6.25 grams (0.027 mole) of 2-dimethyl-aminoethyl alpha-methyl-1-pyrrolidinepropionate in ten milliliters of methanol plus ten milliliters of acetone was treated with 11.7 grams (0.082 mole) of methyl iodide (added cautiously in small portions through the reflux condenser). The solution became quite warm and near the end of the addition the methyl iodide was boiling gently. Twenty milliliters of acetone and a seed crystal were added and after standing overnight, the crystalline product was filtered off and washed with a few milliliters of acetone.

The product was dissolved in seven milliliters of boiling methanol, treated with 25 milliliters of acetone, swirled well and cooled under a cold water tap to yield fine white crystals. After standing overnight these were filtered off, washed twice with five milliliter portions of 75 percent acetone-25 percent methanol, and then with a little acetone. The product was dried to constant weight at 78 degrees centigrade at one millimeter of mercury pressure absolute for three hours to remove solvent of crystallization. The yield of colorless crystals was 11.63 grams (83 percent of the theoretical yield) of 2-trimethylammonio-ethyl 2-methyl-3-(1-methyl-pyrrolidino) propionate diiodide, softening at 154 degrees centigrade, melting at 155–158 degrees centigrade at a heating rate of two degrees per minute.

*Analysis.*—Calculated for $C_{14}H_{30}I_2N_2O_2$: C, 32.83; H, 5.90; I, 49.55; N, 5.47. Found: C, 32.33; H, 5.78; I, 49.30; N, 5.47.

EXAMPLE 11

*2-trimethylammonioethyl 2-methyl-3-(4-methyl-morpholinio)-propionate diiodide*

Eleven grams (0.08 mole) of methyl iodide was added cautiously to five grams (0.02 mole) of 2-dimethylaminoethyl alpha-methyl-4-morpholine-propionate in twenty milliliters of acetone. After standing one and one-half hours, a white crystalline mass had separated which, after two recrystallizations from methanol-acetone, gave 7.4 grams (69 percent of the theoretical yield) of 2-trimethyl-ammonioethyl 2-methyl-3-(4-methylmorpholinio)-propionate diiodide, melting at 166–167 degrees centigrade.

*Analysis.*—Calculated for $C_{14}H_{30}I_2N_2O_3$: C, 31.83; H, 5.73; I, 48.05; N, 5.30. Found: C, 31.38; H, 5.79; I, 48.18; N, 5.25.

EXAMPLE 12

*2-trimethylammonioethyl 2-methyl-3-(4-methyl-morpholinio)-propionate dipicrate*

A solution of 1.0 gram (0.0019 mole) of 2-trimethylammonioethyl 2-methyl-3-(4-methylmorpholinio)propionate diiodide in fifteen milliliters of water was treated with a warm solution of 2.3 grams (0.01 mole) of picric acid in 150 milliliters of water. After cooling, a yellow oil precipitated which gradually crystallized on standing. The product was recrystallized from 300 milliliters of methanol to give 1.3 grams (93 percent of the theoretical yield) of 2-trimethylammonioethyl 2-methyl-3-(4-methylmorpholinio)propionate dipicrate, as yellow crystals, melting at 167–170 degrees centigrade.

*Analysis.*—Calculated for $C_{26}H_{34}N_8O_{17}$: C, 42.74; H, 4.69. Found: C, 42.91; H, 4.82.

In a manner similar to that of the foregoing example, other anions may be substituted for those resulting in the synthesis procedure. Alternatively, by employing other starting materials, other anions will result from the synthesis. Also, the use of anion exchange resins in included to give a product having a different anion, such as those specified hereinbefore.

EXAMPLE 13

*2-trimethylammoniobutyl 3-(1-ethylpiperidinio) propionate diiodide*

A mixture of 1.1 grams (0.0025 mole) of 2-trimethylammoniobutyl 3-iodopropionate iodide and 0.6 gram (0.0005 mole) of 1-ethylpiperidine in ten milliliters of acetone was vigorously shaken. The solid gradually dissolved. After standing at room temperature for one hour, 25 milliliters of ether was added, forcing out a colorless oil. This oil was dissolved in five milliliters of 2B absolute ethanol, and on cooling, the solution yielded colorless crystals. After one further recrystallization from ethanol there was obtained 0.30 gram (22 percent of the theoretical yield) of 2-trimethylammoniobutyl 3-(1-ethylpiperidinio)propionate diiodide, melting at 175–176 degrees centigrade.

Analysis.—Calculated for $C_{17}H_{36}I_2N_2O_2$: C, 36.83; H, 6.55; I, 45.79; N, 5.05. Found: C, 36.56; H, 6.42; I, 45.92; N, 4.82.

EXAMPLE 14

2-(butylethylmethylammonio)ethyl 3-(1-methylpyrrolidinio)-propionate diiodide To twenty (0.074 mole) of 2-(butylethylamino) ethyl 1-pyrrolidinepropionate in eighty milliliters of acetone was added cautiously 42 grams (0.30 mole) of methyl iodide. An oil separated after standing two hours which crystallized on standing. This was combined with the product from another run, which had started with five grams of the bis(tertiary amino) ester. The material was crystallized by precipitation from a cold methanol solution with acetone. Two recrystallizations gave 12.2 grams (24 percent yield) melting at 155–158 degrees centigrade. A second crop of 8.2 grams (16 percent yield) was obtained with the same melting point. The total yield of 2-(butylethylmethylammonio)ethyl 3-(1-methylpyrrolidinio)-propionate diiodide was forty percent.

Analysis.—Calculated for $C_{17}H_{36}I_2N_2O_2$: C, 36.83; H, 6.55; I, 45.79. Found: C, 36.90; H, 6.60; I, 45.73.

EXAMPLE 15

1-methyl-2-trimethylammonioethyl 3-(1,4-dimethylpiperidinio)-propionate diiodide To six grams (0.023 mole) of 2-dimethylamino-1-methylethyl 4-methyl-1-piperidinepropionate in ten milliliters of methanol was added thirteen grams (0.092 mole) of methyl iodide. After one hour, excess methyl iodide was boiled off and acetone was added to crystallize the product. This was filtered and combined with the product of a similar preparation which had started with five grams of the bis(tertiary amino) ester. Recrystallization gave 9.8 grams (42 percent of the theoretical yield) of 1-methyl-2-trimethylammonioethyl 3-(1,4-dimethylpiperidinio)-propionate diiodide, with a melting point of 184–185 degrees centigrade.

Analysis.—Calculated for $C_{16}H_{34}I_2N_2O_2$: C, 35.57; H, 6.34; I, 46.98. Found: C, 35.52; H, 5.89; I, 46.74.

EXAMPLE 16

2-trimethylammonioethyl 3-(4-methylmorpholinio) butyrate diiodide

A solution of 7.33 grams (0.030 mole) of 2-dimethylaminoethyl beta-methyl-4-morpholinepropionate in twenty milliliters of methanol was treated cautiously with 12.77 grams (0.090 mole) of methyl iodide, added in one-milliliter portions through the reflux condenser. The reaction was markedly exothermic, so that the methyl iodide boiled a little near the end of the addition. A seed crystal was added and, a little later, twenty milliliters of acetone was added. The mixture was refluxed for one and one-half hours. After cooling, crystals appeared which were filtered out and washed well with acetone. After drying in vacuo over calcium chloride, the yield of crystals was 12.56 grams (79 percent yield), softening at 195 degrees centigrade and melting at 196–197.5 degrees centigrade. After standing at room temperature for two days, the combined mother liquors and acetone washes yielded an additional crop of crystals. These were recrystallized once from 100 milliliters of boiling methanol to yield 1.36 grams, softening at 193 degrees centigrade and melting at 196–200 degrees centigrade, and made a total yield of 13.92 grams. 11.16 grams of this material was dissolved in twenty milliliters of warm water and diluted with 210 milliliters of acetone to give a momentarily clear solution which soon deposited well-formed, colorless crystals. After forty minutes at room temperature these crystals were filtered out, washed five times with small portions of acetone, then dried at 78 degrees centigrade at one millimeter pressure for one hour. The yield was 9.09 grams (81 percent of the theoretical yield) of 2-trimethylammonioethyl 3-(4-methylmorpholinio)-butyrate diiodide, which softened at 199 degrees centigrade and melted at 200.5–202 degrees centigrade (starting at 180 degrees centigrade and using a temperature rise of two degrees per minute).

Analysis.—Calculated for $C_{14}H_{30}I_2N_2O_3$: C, 31.83; H, 5.73; I, 48.05; N, 5.30. Found: C, 31.84; H, 5.55; I, 47.81; N, 5.19.

EXAMPLE 17

2-(dimethylethylammonio)ethyl 3-(1-methylpyrrolidinio)-butyrate diiodide

Ten grams (0.041 mole) of 2-(ethylmethylamino)ethyl beta-methyl-1-pyrrolidinepropionate was dissolved in 100 milliliters of isopropanol and fifteen grams (0.11 mole) of methyl iodide dissolved in fifty milliliters of isopropanol was added. Precipitation of a crystalline solid began in a few minutes and continued for several hours. After two hours at room temperature, the crystals were separated by centrifugation. They were washed with isopropanol and dried at 100 degrees centigrade at twenty millimeters of mercury pressure absolute, yielding 10.7 grams (crude), melting at 155–156 degrees centigrade. Second and third crops of crystals separated later and had a combined weight of 4.5 grams melting at 155–165 degrees centigrade. The total yield of crude salt was 5.2 grams (70 percent).

One gram of the crude salt was recrystallized from fifty milliliters of two percent water in isopropanol by warming and chilling to give 0.5 gram, melting at 168–170 degrees centigrade. This 0.5 gram was dissolved in 200 milliliters of one percent water in isopropanol and distilled at 35 degrees centigrade at 65 millimeters' pressure. The crystals were separated from the few drops of mother liquor by centrifugation to avoid atmospheric moisture and yielded 0.46 gram melting at 185 degrees centigrade.

The crystals were then dissolved in 100 milliliters of 1.5 per cent water in isopropanol and recrystallized by vacuum distillation to give 0.4 gram of 2-(dimethylethylammonio)ethyl 3-(1-methylpyrrolidinio)butyrate diiodide, melting at 191–192 degrees centigrade, after drying at twenty millimeters of mercury pressure absolute in a steam bath.

Analysis.—Calculated for $C_{15}H_{32}I_2N_2O_2$: C, 34.24; H, 6.13; I, 48.23; N, 5.32. Found: C, 33.35; H, 6.38; I, 48.05; N, 5.39.

In a manner similar to that of the foregoing examples, other diammonio esters within the scope of the present invention may be prepared by substituting appropriate starting materials. For example, R, R', R'', and R''' may be propyl, isopropyl, isobutyl, pentyl, hexyl, et cetera, $n$ and $m$ may be methylene, pentylene, hexylene, et cetera, both straight and branched chain, and other alkyl groups may be substituted on the heterocyclic residue, such as, for example, ethyl, propyl, isopropyl, butyl, isobutyl, pentyl, hexyl, et cetera.

EXAMPLE 18

2-(1-methylpiperidinio)ethyl 3-(1-methylpiperidinio) propionate diiodide

A solution of 1.0 gram (0.0029 mole) of 2-(1-piperidyl)ethyl 1-piperidinepropionate dihydrochloride in ten milliliters of water was treated with 1.0 gram (0.0072 mole) of potassium carbonate. The oil which separated was extracted with three fifteen milliliter portions of ether. After drying over anhydrous magnesium sulfate, the ethereal extracts were filtered, and two grams (0.014 mole) of methyl iodide was added to the ether solution. A colorless oil gradually precipitated. After standing at room temperature for four days, the ether was decanted and the oil recrystallized twice from eight milliliter portions of 2B absolute ethanol to give 0.6 gram (37 percent of the theoretical yield) of 2-(1-methylpiperidinio)ethyl 3-(1-methylpiperidinio)propionate diiodide as colorless crystals, melting at 166–167 degrees centigrade.

*Analysis.*—Calculated for $C_{17}H_{34}I_2N_2O_2$: C, 36.97; H, 6.21; I, 45.96. Found: C, 37.09; H, 5.91; I, 46.20.

EXAMPLE 19

2-(-methylpiperidinio)ethyl 3-(1-methylpiperidinio) propionate diiodide (Alternate method)

A solution of 6.8 grams (0.02 mole) of 2-(1-piperidyl)ethyl 1-piperidinepropionate dihydrochloride in ten milliliters of water was treated with seven grams (0.05 mole) of potassium carbonate in fifteen milliliters of water. The colorless ester which separated was extracted with three fifty-milliliter portions of ether. The combined ethereal solution was dried over magnesium sulfate and filtered. The filtrate was treated with fourteen grams (0.1 mole) of methyl iodide and allowed to stand at room temperature for three days. The ether was decanted from the resultant colorless solid. After two recrystallizations from 2B absolute ethanol, there was obtained 6.4 grams (56 percent of the theoretical yield) of 2-(1-methylpiperidinio)ethyl 3 - (1 - methylpiperidinio)propionate diiodide, as colorless crystals, melting at 165–167 degrees centigrade.

EXAMPLE 20

1-methyl-2-(1-methylpiperidinio)ethyl 3-(1-methyl piperidinio)-propionate diiodide To a solution of 6.0 grams (0.021 mole) of the crude 1-methyl-2-(1-piperidyl)ethyl 1-piperidinepropionate prepared according to Preparation 27, in 75 milliliters of acetone was added fourteen grams (0.10 mole) of methyl iodide. After standing at room temperature for eight hours, the acetone was decanted and the colorless oil dissolved in twenty milliliters of refluxing methanol. On cooling, there was obtained 6.1 grams (51 percent of the theoretical yield) of colorless crystals. One more recrystallization from methanol, gave 5.5 grams of 1-methyl-2-(1-methylpiperidinio)ethyl 3-(1-methylpiperidinio)propionate diiodide as colorless crystals, melting at 182–185 degrees centigrade.

*Analysis.*—Calculated for $C_{18}H_{38}I_2N_2O_2$: C, 38.17; H, 6.41; I, 44.82. Found: C, 38.00; H, 6.56; I, 45.15.

EXAMPLE 21

1-methyl-2-(4-methylmorpholinio)ethyl 3-(4-methylmorpholinio)propionate diiodide A solution of six grams (0.02 mole) of crude 1-methyl-2-(4-morpholinyl)ethyl 4-morpholinepropionate and 28 grams (0.20 mole) of methyl iodide in 100 milliliters of acetone was allowed to stand at room temperature for 24 hours. The supernatant liquid was decanted from the colorless oil which had precipitated, and the oil was dissolved in 25 milliliters of methanol. On cooling of the mixture in an ice chest, there was obtained 4.2 grams (35 percent of the theoretical yield) of 1-methyl-2-(4-methlymorpholinio)ethyl 3-(4-methylmorpholinio)propionate diiodide as colorless crystals, melting at 195–196 degrees centigrade. Further recrystallizations from methanol did not affect the melting point.

*Analysis.*—Calculated for $C_{16}H_{32}I_2N_2O_4$: C, 33.70; H, 5.66; I, 44.51. Found: C, 33.30; H, 5.83; I, 44.52.

EXAMPLE 22

1-methyl-2-(1-methylpyrrolidinio)ethyl 3-(1-methylpyrrolidinio)propionate diiodide A mixture of five grams (0.020 mole) of 1-methyl-2-(1-pyrrolidinyl)ethyl 1-pyrrolidinepropionate in ten milliliters of acetone with eleven grams (0.077 mole) of methyl iodide gave an oil which crystallized on standing overnight. This was recrystallized from methanol-acetone to give 7.8 grams (74 percent of the theoretical yield) of 1-methyl-2-(1-methylpyrrolidinio)ethyl 3-(1-methylpyrrolidinio)propionate diiodide, melting at 160–161 degrees centigrade.

*Analysis.*—Calculated for $C_{16}H_{32}I_2N_2O_2$: C, 35.70; H, 5.99; I, 47.16. Found: C, 35.53; H, 5.99; I, 47.90.

EXAMPLE 23

1-methyl-2-(1-methylpyrrolidinio)ethyl 3-(1-methylpyrrolidinio)propionate dinitrate A solution of 2.7 grams (0.005 mole) of the diiodide salt in fifteen milliliters of water was passed into an A-40 resin column [Chemical Process Co., Redwood City, California]. The column was prepared from 100 milliliters of resin slurry which had been washed with one normal nitric acid followed by distilled water until the washings were neutral. The salt solution was followed by a wash of 100 milliliters of distilled water. The eluate and wash were combined and evaporated to a colorless glass, which yielded colorless crystals from 25 milliliters of isopropanol, there was obtained 0.9 gram (45 percent of the theoretical yield) of 1-methyl-2-(1-methylpyrrolidinio)ethyl 3 - (1 - methylpyrrolidinio)propionate dinitrate, as colorless hygroscopic crystals, melting at 143–144 degrees centigrade.

*Analysis.*—Calculated for $C_{16}H_{32}N_4O_8$: C, 47.05; H, 7.90. Found: C, 46.8; H, 7.9.

In a manner similar to that of the above example, other anions may be substituted for the diiodides specifically disclosed herein, and other acids, such as, for example, citric, picric, phosphoric, lactic, et cetera, may be substituted for the nitric acid shown.

EXAMPLE 24

2-pyridinioethyl 3-pyridiniopropionate dibromide

A solution of 3.7 grams (0.0142 mole) of 2-bromoethyl 3-bromopropionate [prepared by the method of Schueler and Keasling, J. Am. Pharm. Assn. 43, 98 (1945)] and 4.5 grams (0.057 mole) of dry pyridine in 25 milliliters of benzene was heated under reflux for sixteen hours. The benzene was decanted and the semisolid residue was crystallized from 100 milliliters of isopropanol to give 2.5 grams of colorless solid. This was recrystallized from 25 milliliters of 2B absolute ethanol to give 1.2 grams of 2-pyridinioethyl 3-pyridiniopropionate dibromide, as colorless crystals, melting at 215–216 degrees centigrade. After one further recrystallization the compound was dried at 78 degrees centigrade at one millimeter pressure for one hour and analyzed.

*Analysis.*—Calculated for $C_{15}H_{18}Br_2N_2O_2$: O, 43.08; H, 4.34. Found: O, 43.4; H, 4.4.

EXAMPLE 25

2-(4-methylmorpholinio)-butyl 3-trimethylammoniopropionate diiodide 2.58 grams (0.01 mole) of 2-(4-morpholinyl)-butyl 3-dimethylaminopropionate and 3.0 grams (0.021 mole) of methyl iodide were dissolved together in 25 milliliters of acetone. The reaction was rapid and an amorphous precipitate formed which crystallized after some days. The acetone was decanted; crude yield, 3.4 grams (63 percent), melting point 154–158 degrees centigrade.

The product was dissolved in 4 milliliters of water and a little methanol. A total of 50 milliliters of acetone was added and a small precipitate formed which practically dissolved on adding 1.5 milliliters of water. It was filtered. To the filtrate was added 0.5 milliliter of water and 24 milliliters of acetone. After chilling to +2 degrees centigrade, crystals formed and were increased by adding 50 milliliters of acetone in small portions. The mother liquor was decanted after some days and the crystals washed with isopropanol. The dried crystals of 2 - (4 - methylmorpholinio)butyl 3 - trimethylammoniopropionate diiodide weighed 1.24 grams (27 percent recovery), melting point 170–172 degrees centigrade (not increased by recrystallization).

*Analysis.*—Calculated: C, 33.23; H, 5.95; I, 46.81; N, 5.17. Found: C, 32.72; H, 6.25; I, 46.46; N, 5.08.

EXAMPLE 26

*2-(4-methylmorpholinio)-propyl 3-trimethylammoniopropionate diiodide*

3.7 grams (0.015 mole) of 2-(4-morpholinyl)-propyl 3-dimethylaminopropionate and 5 grams (0.035 mole) of methyl iodide were dissolved together in 12 milliliters of acetone in a flask with attached reflux condenser. After some exothermic reaction, the mixture was refluxed for an hour. The precipitate was separated and desiccated to remove solvent. The dry powder remaining was 6.52 grams, 82 percent of the theoretical yield.

The 3.7 gram batch was purified. The desiccated reaction product, an amorphous powder, was extracted with three portions of hot ethanol. On cooling, crystals were obtained, melting point 160–170 degrees centigrade. The mother liquors were preserved and concentrated in vacuo to oily residues which were combined. By a series of crystallizations and concentrations of mother liquors, 0.63 gram of 2-(4-methylmorpholinio)-propyl 3-trimethylammoniopropionate diiodide was obtained, melting point 170–175 degrees centigrade. The solvent was hot 95 percent ethanol.

*Analysis.*—Calculated: C, 31.83; H, 5.73; I, 48.05; N, 5.30. Found: C, 31.53; H, 5.94; I, 46.75; N, 5.02.

EXAMPLE 27

*2-(1-methylpyrrolidinio)-ethyl (1-methylpyrrolidinio)-acetate diiodide*

A solution of 3.3 grams of the mixture of 2-(1-pyrrolidinyl)-ethyl pyrrolidineacetate and 1-(1-pyrrolidinyl-acetyl)-pyrrolidine in 100 milliliters of ether was treated with 14 grams (0.1 mole) of methyl iodide. After standing overnight at room temperature, the ether was decanted from the oily product. This oil was dissolved in 30 milliliters of isopropanol, and yielded, after cooling in the ice chest overnight, 5.0 grams of mixed colorless needles and yellow granules. The mixture was digested with two 100-milliter portions of refluxing acetone, and the insoluble colorless needles were recrystallized from 50 milliliters of isopropanol and 15 milliliters of methanol to give 1.3 grams of 2-(1-methylpyrrolidinio)-ethyl (1-methylpyrrolidinio)-acetate diiodide as colorless needles, melting point 222–224 degrees centigrade, with decomposition.

*Analysis.*—Calculated: C, 32.96; H, 5.53; I, 49.75; N, 5.49. Found: C, 32.74; H, 5.65; I, 49.26.

EXAMPLE 28

*2-(1-methylpyrrolidinio)-ethyl 3-(1-methylpyrrolidinio)-propionate diiodide*

A solution of 1.2 grams (0.0050 mole) of 2-(1-pyrrolidinyl)-ethyl 1-pyrrolidinepropionate and 5 grams (0.035 mole) of methyl iodide in 50 milliliters of acetone commenced to deposit colorless crystals about one minute after mixing. After standing at room temperature for seven hours, the acetone was decanted and the colorless crystals recrystallized from 18 milliliters of methanol and 50 milliliters of isopropanol to give 1.6 grams of 2-(1-methylpyrrolidinio)-ethyl 3-(1-methylpyrrolidinio)-propionate diiodide (61 percent) as colorless needles, melting point 176–177 degrees centigrade. A small sample was recrystallized to give finely divided crystals of the same melting point.

*Analysis.*—Calculated: C, 34.37; H, 5.77; I, 48.42; N, 5.34. Found: C, 33.98; H, 5.65; I, 47.56.

EXAMPLE 29

*1,1-dimethyl-2-(1-methylpyrrolidinio)-ethyl 3-(1-methylpyrrolidinio)-propionate diiodide*

A solution of 2.0 grams (0.0075 mole) of 1,1-dimethyl-2-(1-pyrrolidinyl)-ethyl 3-pyrrolidinepropionate in 15 milliliters of 2B absolute ethanol was treated with 5 milliliters (11.4 grams, 0.080 mole) of methyl iodide and after thirty minutes at room temperature it was seeded and stored overnight at +2 degrees centigrade. The colorless needles were recrystallized from 15 milliliters of 2B absolute ethanol (much tendency to "oil" out by standing overnight at +2 degrees centigrade. The yield of colorless, hygroscopic product, 1,1-dimethyl-2-(1-methylpyrrolidinio) - ethyl 3 - (1 - methylpyrrolidinio) - propionate diiodide, was 3.6 grams (87 percent), melting at 90–93 degrees centigrade.

*Analysis.*—Calculated: C, 36.97; H, 6.21; I, 45.96; N, 5.07. Found: C, 37.2, H, 6.5; I, 45.8.

EXAMPLE 30

*1-methyl-2-(1-methylpyrrolidinio)-ethyl 3-(1-methylpyrrolidinio)-propionate dipicrate*

A solution of 1.0 gram (0.0019 mole) of 1-methyl-2-(1-methylpyrrolidinio)-ethyl 3-(1-methylpyrrolidinio)-propionate diiodide in 50 milliliters of water was mixed with 2.0 grams (0.0087 mole) of picric acid in 150 milliliters of warm water. After standing a few hours at room temperature, the canary yellow crystals were filtered and digested with 200 milliliters of methanol at room temperature for several days. There was obtained 1.2 grams (87 percent) of canary yellow crystals, 1-methyl-2-(1-methylpyrrolidinio)-ethyl 3-(1-methylpyrrolidinio)-propionate dipicrate, melting point 172 degrees centigrade.

*Analysis.*—Calculated: C, 45.41; H, 4.90; N, 15.13. Found: C, 45.34; H, 4.99.

EXAMPLE 31

*1-methyl-2-(1-methylpyrrolidinio)-ethyl 3-(1-methylpyrrolidinio)-propionate dibi-d-tartrate*

Eight liters of wet A–40 resin in the form of the free base was treated batch-wise with two 8-liter portions of 1 M tartaric acid. The resin was then washed with distilled water batch-wise until washings were at a pH of 4. This required 176 liters of water. The washing curve had the form of an elution curve rather than a dilution curve, thus explaining the large volume of wash water required. The resin was packed in a glass column and back-washed until a uniform gradient of particle size was obtained. A solution of 680 grams (1.26 moles) of O–305 in one liter of water was passed onto the column followed by distilled water. The eluent was tested at intervals with saturated aqueous picric acid. The O–305–C broke through after 2.5 liters of eluent were collected and the test with picric acid became negative after 8 liters of eluent was collected. Rate of flow was about 3 liters per hour.

This eluent was evaporated at reduced pressure on the steam bath in one-liter portions. The oily residues were dissolved in methanol and acetone was added to turbidity. After cooling in the ice chest for a couple of days, there was obtained a first crop of 139.3 grams of colorless crystals, melting point 145–148 degrees centigrade (anal. melting point 145 degrees centigrade). The mother liquors were again treated with acetone to turbidity and 2 M tartaric acid in methanol was added until no additional turbidity was caused by further addition (pH of resultant solution, diluted with an equal volume of water, was 4). This solution deposited an oil which was dissolved in 1.6 liters of methanol and treated with 2.4 liters of acetone. After standing several days at room temperature there was obtained 208.3 grams of colorless 1-methyl-2-(1-methylpyrrolidinio)-ethyl 3-(1-methylpyrrolidinio)-propionate dibi-d-tartrate. A further 25.4 grams of 1-methyl-2-(1-methylpyrrolidinio)-ethyl 3-(1-methylpyrrolidinio)-propionate dibi-d-tartrate, melting point 145–148 degrees centigrade, was obtained by placing the mother liquors in the ice chest for several days. Total yield was 373.0 grams, or 51 percent.

*Analysis.*—Calculated: C, 49.48; H, 7.27; N, 4.81. Found: C, 49.28; H, 7.26.

In a manner similar to that of the foregoing examples, other compounds within the scope of the present invention containing other alkylene groups in the alcohol moiety, such as, for example, methyl, propyl, isopropyl, butyl, isobutyl, pentyl, hexyl, et cetera, may be substituted for the ethyl group shown and other alkylene groups may be substituted for the ethyl specifically shown in the acid moiety, such as, for example, methyl, propyl, isopropyl, butyl, hexyl, et cetera.

This application is a continuation-in-part application (combining all of the subject-matter of) our copending prior filed applications:

Serial Nos. 462,402, 462,403 and 462,404, all filed October 14, 1954, and respectively entitled "Heterocyclic Alcohol Diammonio Esters," "Heterocyclic Acid Diammonio Esters," and "Diammonio Esters Containing Two Heterocyclic Groups," now abandoned.

Various modifications, which will be obvious from the foregoing to persons skilled in the art, may be made in the compounds of the present invention without departing from the spirit or scope thereof, and, therefore, it is to be understood that we limit ourselves only as defined in the appended claims.

We claim:
1. 2-(1-ethylpiperidinio)-ethyl 3-trimethylammoniopropionate dibitartrate.
2. 1-methyl-2-(1-methylpiperidinio)-ethyl 3-(1-methylpiperidinio)-propionate diiodide.
3. 1-methyl-2-(4-methylmorpholinio)-ethyl 3-(4-methylmorpholinio)-propionate diiodide.
4. 1-methyl-2-(1-methylpyrrolidinio)-ethyl 3-(1-methylpyrrolidinio)propionate dinitrate.
5. 2-trimethylammonioethyl 3-(4-methylmorpholinio)-butyrate diiodide.
6. 2-(1,4-dimethylpiperidinio)-1-methylethyl 3-trimethylammoniopropionate diiodide.
7. A bisquaternary ammonium compound of the formula

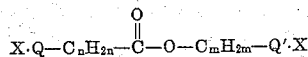

wherein X is a non-toxic, therapeutically useful acid anion, $n$ and $m$ are each integers from one to six inclusive, one of the groups Q and Q' is a member of the group consisting of N-lower alkyl-1-pyrrolidinium, N-lower alkyl-1-piperidinium, N-lower alkyl-4-morpholinium, and N-pyridinium and the other is a member of the group consisting of tri-lower-alkylammonium, N-lower alkyl-1-pyrrolidinium, N-lower alkyl-1-piperidinium, N-lower alkyl-4-morpholinium and N-pyridinium, and wherein $C_nH_{2n}$ and $C_mH_{2m}$ each are branched chain alkylenes.

8. A bisquaternary ammonium compound of the formula

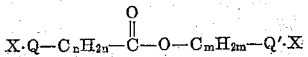

wherein X is a non-toxic, therapeutically useful acid anion, $n$ and $m$ are each integers from one to six inclusive, one of the groups Q and Q' is a member of the group consisting of N-lower alkyl-1-pyrrolidinium, N-lower alkyl-1-piperidinium, N-lower alkyl-4-morpholinium, and N-pyridinium and the other is a member of the group consisting of tri-lower-alkylammonium, N-lower alkyl-1-pyrrolidinium, N-lower alkyl-1-piperidinium, N-lower alkyl-4-morpholinium and N-pyridinium, and wherein $C_nH_{2n}$ and $C_mH_{2m}$ each are straight chain alkylenes.

9. A bisquaternary ammonium compound of the formula $$X \cdot Q - C_nH_{2n} - \overset{O}{\underset{\|}{C}} - O - C_mH_{2m} - Q' \cdot X$$

wherein X is a non-toxic, therapeutically useful acid anion, $n$ and $m$ are each integers from one to six inclusive, one of the groups Q and Q' is a member of the group consisting of N-lower alkyl-1-pyrrolidinium, N-lower alkyl-1-piperidinium, N-lower alkyl-4-morpholinium, and N-pyridinium and the other is a member of the group consisting of tri-lower-alkylammonium, N-lower alkyl-1-pyrrolidinium, N-lower alkyl-1-piperidinium, N-lower alkyl-4-morpholinium and N-pyridinium, and wherein one member of the group $C_nH_{2n}$ and $C_mH_{2m}$ is a branched chain alkylene while the other member is a straight chain alkylene.

References Cited in the file of this patent
UNITED STATES PATENTS

| | | |
|---|---|---|
| 2,460,139 | Marks et al. | Jan. 25, 1949 |
| 2,683,167 | Girod et al. | July 6, 1954 |

OTHER REFERENCES

Gazz. Chim. Ital., I, vol. 79, pp. 836–848 (1949), abstracted in C.A., vol. 45, pp. 549–51.

Gazz. Chim. Ital., II, vol. 79, pp. 129–41 (1949), abstracted in C.A., vol. 44, p. 1031e.

UNITED STATES PATENT OFFICE
CERTIFICATE OF CORRECTION

Patent No. 2,980,673                                April 18, 1961

John Hidalgo et al.

It is hereby certified that error appears in the above numbered patent requiring correction and that the said Letters Patent should read as corrected below.

Column 2, line 7, for "cmpounds" read -- compounds --; column 5, line 38, for "motor" read -- mother --; column 13, line 61, and column 14, line 17, for "3-trimethylammoniopro-", each occurrence, read -- 3-trimethylammonio---; column 19, line 5, for "2-(-methylpiperidinio)" read -- 2-(1-methylpiperidinio) --.

Signed and sealed this 26th day of September 1961.

(SEAL)
Attest:

ERNEST W. SWIDER
Attesting Officer

DAVID L. LADD
Commissioner of Patents
USCOMM-DC